Figure 1:
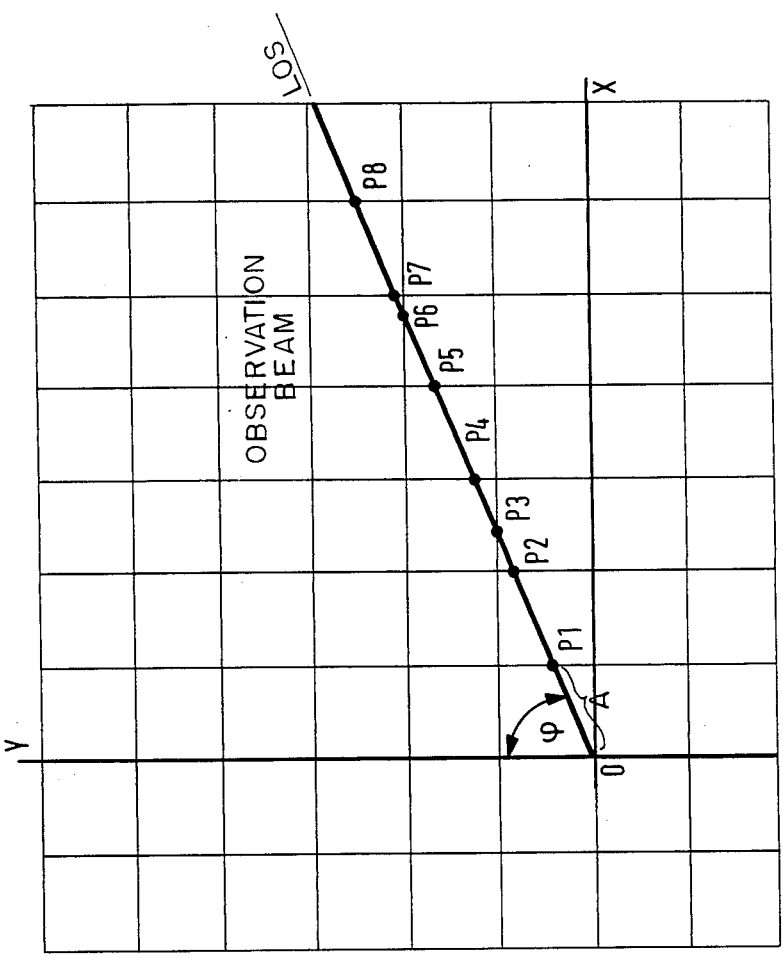

United States Patent [19]

Weber et al.

[11] Patent Number: 4,755,959

[45] Date of Patent: Jul. 5, 1988

[54] CIRCUIT ARRANGEMENT FOR CALCULATING A VISUAL DISTANCE IN A DIGITALLY STORED GROUND MODEL

[75] Inventors: Reiner Weber; Wolfgang Geiger, both of Ottobrunn; Manfred Hübschmann, Taufkirchen; Erwin Quednau, Munich, all of Fed. Rep. of Germany

[73] Assignee: IBP Pietzsch GmbH, Ettlingen, Fed. Rep. of Germany

[21] Appl. No.: 734,194

[22] Filed: May 15, 1985

[30] Foreign Application Priority Data

May 16, 1984 [DE] Fed. Rep. of Germany ....... 3418246

[51] Int. Cl.$^4$ .................. G01B 21/00; G06G 7/80
[52] U.S. Cl. ..................................... 364/561; 235/414
[58] Field of Search .............. 364/561, 559, 560, 562, 364/423; 342/64, 126; 340/541; 356/3, 2; 235/414

[56] References Cited

U.S. PATENT DOCUMENTS

| | | | |
|---|---|---|---|
| 4,263,656 | 4/1981 | Yamaguchi et al. | 364/559 |
| 4,295,201 | 10/1981 | Wiklund | 364/561 |
| 4,333,154 | 6/1982 | Devand et al. | 364/559 |

Primary Examiner—Parshotam S. Lall
Assistant Examiner—S. A. Melnick
Attorney, Agent, or Firm—Rogers & Killeen

[57] ABSTRACT

A circuit arrangement for calculating a visual line of sight distance in digitally stored model. A distance long the line of sight is calculated by stepping radially outward along the line of sight. The step sizes which are chosen are selected based on the angle of the line of sight to the grid of the stored model and are selected to ensure that the evaluation points are at points of the grid. The stepping along the line of sight is performed by two sets of integrators and the output of one of the two sets of integrators is selected.

5 Claims, 3 Drawing Sheets

CIRCUIT ARRANGEMENT FOR CALCULATING A VISUAL DISTANCE IN A DIGITALLY STORED GROUND MODEL

BACKGROUND OF THE INVENTION

The invention is directed to a circuit arrangement for calculating a visual distance in a digitally stored ground model. The invention has application generally in any device for calculating visual distances and particularly in a digital ground model used in armament, such as tanks, for calculating "line of sight" distance.

It is expedient for such a visual distance calculation to spread an equidistant grid over the ground. To the particular surface elements of the ground, which are delimited by the grid lines of the grid, constant characteristics, for instance same level or the like, are appointed. Such a surface element is called in the following as a raster element of thus formed ground model beam lines often known as "characteristic points."

As it is desirable to provide high-speed visual distance calculation, it has been common practice to use a separate arithmetic unit for this purpose. Prior arithmetic units are based on the principle of dividing the visual distance along the observation beam into sub-sections of constant step width and to process the respective raster element after each step. In order to avoid having to omit too many of the relevant raster points, the step width of the observation beam must be minimized. The result is that normally plural points are processed in one raster element. In this way much time is consumed unnecessarily.

As in a raster element as described above the characteristics are constant, it is sufficient to choose as characteristic points to be worked on the points of intersection of the sight lines with the grid lines. The time used in the conventional arrangement is dependent on the required preciseness.

The invention is based on the object of providing a circuit arrangement for calculating a visual distance in a digitally stored ground model, comprising an arithmetic unit for performing calculation of the visual distance in as short a time as possible.

This object is solved by the features of the present invention in which the results achieved by the circuit arrangement of the invention do not depend on the required preciseness but instead are principally free of errors. All raster elements are found which are passed by the line of sight.

The configuration according to the invention allows very precise access to those raster elements which are required for perfectly calculating a visual communication path, i.e., the advantage resides in that calculation of the visual distance is achieved at minimum time expenditure.

THE DRAWINGS

Figure 2:
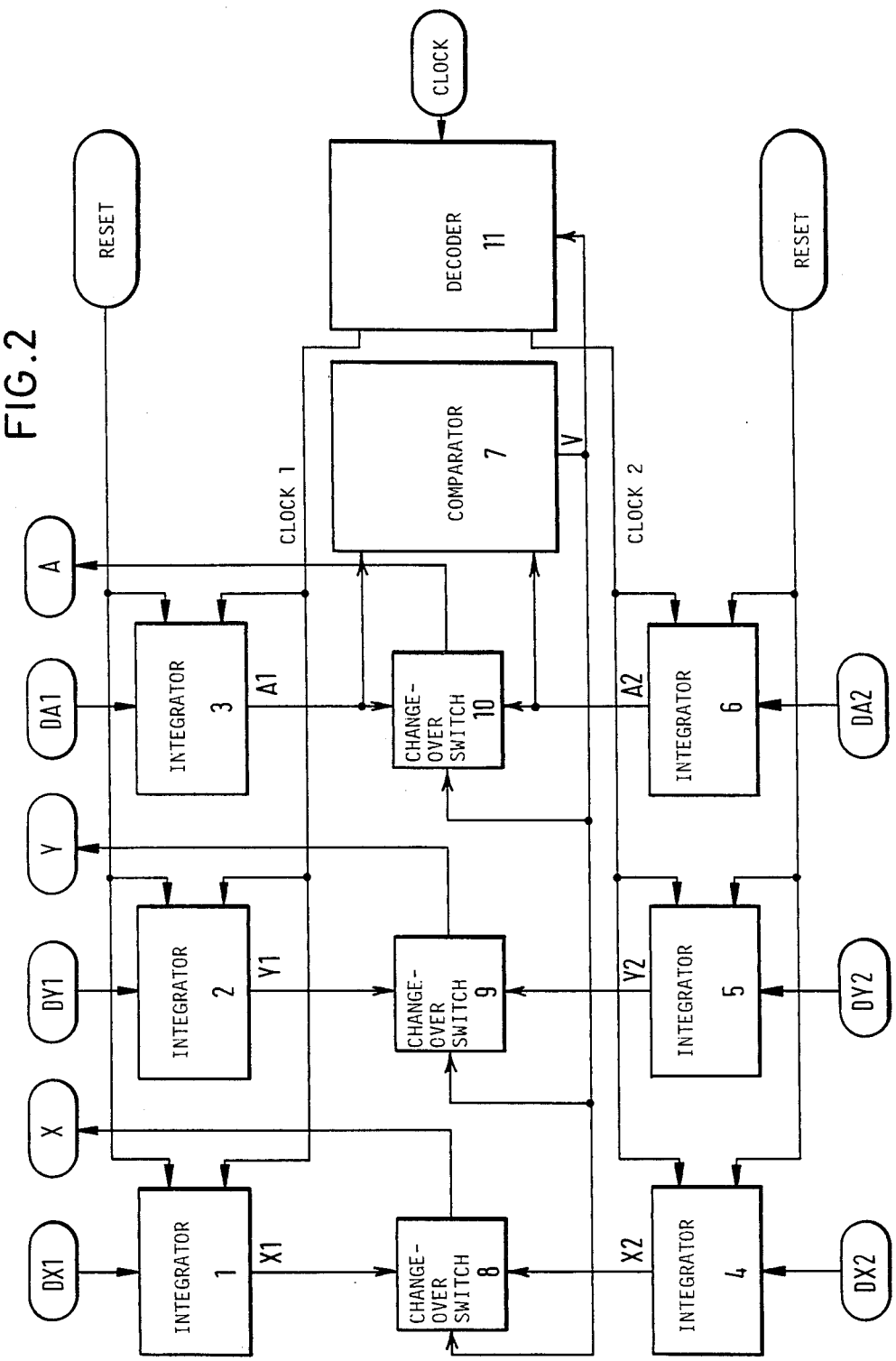

The invention will be explained by way of an example with reference to the drawings, in which FIG. 1 is an illustration of the mode of operation of the circuit arrangement according to the invention, FIG. 2 is an embodiment of the circuit arrangement according to the invention, and FIGS. 3a-3c illustrate possible embodiments of the integrators.

DETAILED DISCUSSION OF THE PREFERRED EMBODIMENTS

As shown in FIG. 1, a square grid having the standardized mesh width 1 is provided in the system of coordinates XY. Starting from the coordinate origin O, the observation beam extends at the angle phi to the ordinate Y. The limits of each raster element in direction X are found by progressing in each step for the width of one raster element in direction Y and by calculating the corresponding value X. The limits of each raster element in direction Y are found by progressing in each step for the width of the raster element in direction X and by calculating the corresponding value Y.

If the width of each step is chosen as DA the width in direction X will become $DX=DA\cdot\sin\text{phi}$ and $DY=DA\cdot\cos\text{phi}$. In order to make the step width in direction X equal to $\pm 1$, DA is to be chosen as $DA1/|\sin\text{phi}|$. Then $DX1=\pm 1$, and $DY1=\cos\text{phi}/|\sin\text{phi}|$. In order to make DY equal to $\pm 1$, correspondingly $DA2=1/|\cos\text{phi}|$. Then DX2 will become $\sin\text{phi}/|\cos\text{phi}|$ and $DY2=\pm 1$.

Characteristic points P1 to P8 are thus located along the observation beam.

As shown in FIG. 2, the circuit arrangement comprises two groups of integrators 1, 2, 3 and 4, 5, 6 to the inputs of which the following trigonometric values are applied:

$$DX1 = \frac{\sin\text{phi}}{|\sin\text{phi}|} \quad DY1 = \frac{\cos\text{phi}}{|\sin\text{phi}|} \quad DA1 = \frac{1}{|\sin\text{phi}|}$$

$$DX2 = \frac{\sin\text{phi}}{|\cos\text{phi}|} \quad DY2 = \frac{\cos\text{phi}}{|\cos\text{phi}|} \quad DA2 = \frac{1}{|\cos\text{phi}|}$$

To the outputs of the integrators change-over circuits 8, 9 and 10 are connected in pairs, the output signals from said change-over circuits representing the coordinates X and Y and the distance (visual distance) A of the respective 5 characteristic point. In a preferred embodiment, the change-over circuits are configured each by a multiplexer SN74157 made and sold by Texas Instruments Corporation. A comparator 7 is connected with its inputs to the outputs of integrators 3 and 6. Comparator 7 determines which group of integrators 1 to 3 or 4 to 6, respectively receives the next clock pulse and which values X1, Y1, A1 or X2, respectively are passed to outputs X, Y, A. In a preferred embodiment, the comparator is configured by comparator SN7485 of Texas Instruments Corporation. A decoder 11 supplies clock pulses corresponding to the outputs of comparator 7 to the integrators 1 to 3 or 4 to 6 respectively. In a preferred embodiment, decoder 11 is configured by multiplexer SN74157 made and sold by Texas Instruments Corporation.

The mode of operation of the circuit arrangement will be described below.

By means of a common start pulse all of the integrators 1, 2, 3 and 4, 5, 6 are reset to zero. The above-mentioned trigonometric values are applied to the inputs of the integrators. The comparator 7 judges that the output signal A1 from the third integrator 3 of the first group of integrators is not smaller than the output signal A2 from the third integrator 6 of the second group of integrators, and sets the change-over circuits 8, 9 and 10 such that the values X=X2, Y=Y2 and A=A2 appear at the outputs thereof and are thus ready for processing. Moreover, the clock pulse 2 for the integrators 4, 5 and 6 is triggered via the decoder 11 to initiate the next integration step.

The comparator 7 now judges A2 to be smaller than A2 and causes the values X=X1, Y=Y1 and A=A1 to appear at the outputs of the change-over circuits 8, 9 and 10 and triggers the clock pulse 1. Thus, the coordinates of point P1 in FIG. 1 reside in the integrators 1 and 2, and the coordinates of the point P3 reside in the integrators 4 and 5. The integrators 3 and 6 include the associated distances from the origin A1 and A2. A1 being smaller than A2, the coordinates of point A1 are not made available at the outputs of the change-over circuits 8 and 9. The circuit now functions such that for each further clock pulse which is supplied to the integrators, the coordinates of the points of intersection with the grid occur sequentially—at monotonically increasing distances A from the origin—at the X/Y outputs of the circuit.

For a perspective ground display, a height value is required in addition to each coordinate point, said height value being taken from an existing ground data bank.

Figure 3:
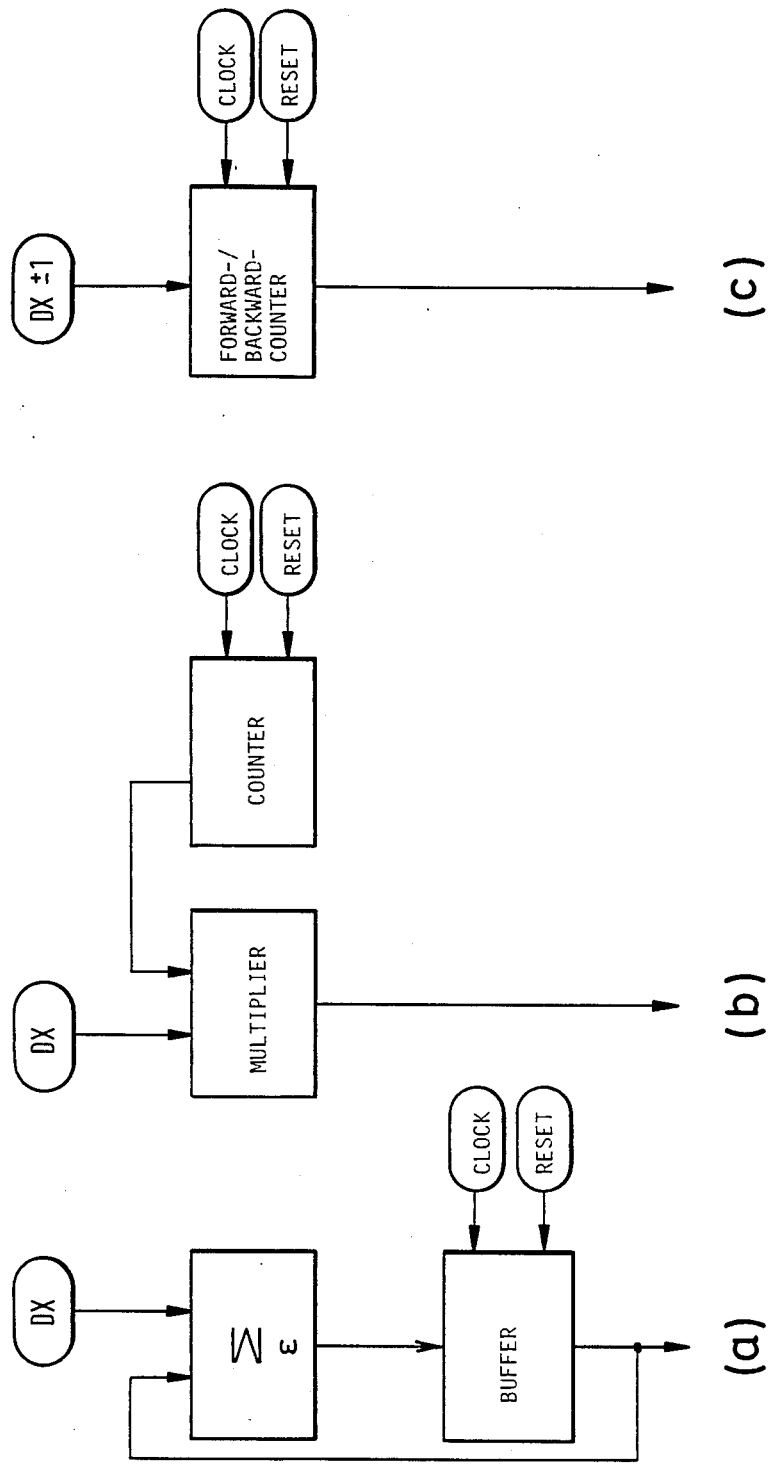

In accordance with FIG. 3, the integrators may be composed of summing circuits and buffers (FIG. 3a). As the values to be integrated are constant, it is also possible to use multipliers together with counters (FIG. 3b). In case the value to be integrated is ±1, it is also possible to use only a counting circuit (FIG. 3c).

In a preferred embodiment according to FIG. 3b, a multiplier ADSP 1010 and a counter SN74161, both made and sold by Texas Instruments Corporation, are used.

What is claimed is:

1. A circuit for calculating a distance along a line of sight from a source point in an x,y grid having spaced elements at an angle $\phi$ with respect to the x axis, comprising:
   a first set of integrators each having an input terminal for receiving an input signal related to (a) a trigonometric value of the angle $\phi$ and (b) the size of the elements of the grid, and each providing an output signal to an output terminal and integrating the received input signal for one step upon the receipt of a clock pulse;
   a second set of integrators each having an input terminal for receiving an input signal related to (a) a trigonometric value of the angle $\phi$ and (b) to the size of the elements of the grid, and each providing an output signal to an output terminal and integrating the received input signal for one step upon the receipt of a clock pulse;
   a set of changeover circuits electrically connected to the output terminals of both first set and second set of integrators for selectively providing the output signals from one of said sets of integrators as the output signals for the circuit;
   a comparator for comparing the output signal of one of the integrators of said first set of integrators with the output signal of one of the integrators of said second set of integrators; and
   control means for selectively operating said set of changeover circuits to provide the output signals from the set of integrators containing the smaller value of the compared signals and to provide an integrating clock pulse to the same set of integrators.

2. A circuit for calculating a distance along a line-of-sight from a source point in a x,y grid having spaced elements at an angle $\phi$ with respect to the x axis, comprising:
   first integrating means for receiving a first input signal having plural components, said signal being related to a trigonometric value of the angle $\phi$ and the size of the elements of the grid, said means being responsive to said first input signal for providing a first output signal related to grid coordinates and distsnce along the line-of-sight and for integrating said input signal for one step upon the receipt of a clock pulse;
   second integrating means for receiving a second input signal having plural components, said signal having plural components, said signal being related to a trigonometric value of the angle $\phi$ and the size of the elements of the grid, said second integrating means being responsive to said second input signal for providing a second output signal related to grid coordinates and distance along the line-of-sight and for integrating said second input signal for one step upon the receipt of a clock pulse;
   means for receiving said first and second output signals, for comparing a preselected component of said output signals, for providing as its output signal one of said first and second output signals in response to said comparison, and for applying a clock pulse to one of said first and second integrating means.

3. A method of calculating the line-of-sight distance from a point within an x,y grid to an object at angle $\phi$ with respect to an axis of the grid, comprising:
   a. providing first and second groups of integrators, each group of integrators being responsive to independent clock pulses to execute an integration step;
   b. providing both groups of integrators with signals related to trigonometric values of the angle $\phi$;
   c. providing the first group of integrators with signals related to:
      (1) the change in X for each unit change in Y, and
      (2) the change in the line-of-sight distance for each unit change in Y,
      (3) the unit change in Y;
   d. providing the second group of integrators with signals related to:
      (1) the change in Y for each unit change in X, and
      (2) the change in the line-of-sight distance for each unit change in X,
      (3) the unit change in X;
   e. selectively connecting the output signals from one of said first and second group of integrators to output terminals as a function of the relative value of the integrated value of the distance along the line-of-sight as provided by the first and second groups of integrators; and
   f. providing a clock pulse to the group of integrators selectively connected to the output terminals.

4. A LOS circuit for calculating the line-of-sight distance from a point within a x,y grid comprising:
   a first group of three integrators each responsive to a clock pulse for performing an integration step on an input signal related to one of:
      (a) the change in X along the line-of-sight per unit chang in Y,
      (b) the unit change in Y, and
      (c) the change in the line-of-sight distance per unit change in Y;

a second group of three integrators each responsive to a clock pulse for performing an integration step on an input signal related to one of:
(d) the unit change in X,
(e) the change in Y along the line-of-sight per unit change in X, and
(f) the change in the line-of-sight distance per unit change in X,
a changeover circuit connected to receive output signals from said first and second groups of integrators and to provide one of said received output signals as the LOS circuit output signal;
a comparator circuit for comparing the output signal from one of said three integrators in said first group of integrators with the output signal from one of said three integrators in said second group of integrators; and,
control means to operate said changeover circuit responsively to said comparator and to selectively provide a clock pulse to one of said first and second groups of integrators.

5. The LOS circuit of claim 4 wherein said changeover circuit is operated to provide said LOS circuit output signal from said first group of integrators whenever the output signal from said one integrator in said first group of integrators is smaller than the output signal from said one integrator in said second group of integrators.

* * * * *